United States Patent [19]
Piscitelli

[11] Patent Number: 5,671,911
[45] Date of Patent: Sep. 30, 1997

[54] BY-PASS BALL VALVE

[75] Inventor: John Samuel Piscitelli, Pittsburgh, Pa.

[73] Assignee: Amcast Industrial Corporation, Dayton, Ohio

[21] Appl. No.: 689,222

[22] Filed: Aug. 7, 1996

[51] Int. Cl.[6] ................................................. F16K 11/087
[52] U.S. Cl. ..................... 251/315.14; 137/625.47
[58] Field of Search ................... 137/625.47; 251/315.14

[56]  References Cited

U.S. PATENT DOCUMENTS

| | | | |
|---|---|---|---|
| 3,463,451 | 8/1969 | Treadwell | 251/315.14 |
| 3,817,271 | 6/1974 | Roven . | |
| 4,084,785 | 4/1978 | Herbert et al. | 137/625.47 X |
| 4,173,234 | 11/1979 | Thomas et al. | 137/625.47 |
| 4,327,895 | 5/1982 | Blumenbray et al. | 251/315.14 |
| 4,936,545 | 6/1990 | Ferrero . | |
| 5,172,557 | 12/1992 | Hubbell, Jr. . | |
| 5,269,344 | 12/1993 | McHugh | 137/559 X |
| 5,396,774 | 3/1995 | Hubbell, Jr. . | |
| 5,397,100 | 3/1995 | Miller . | |

OTHER PUBLICATIONS

Brochure—"Henry Three Way Dual Shut–Off Valves"; Henry Valve Company, Melrose Park, Illinois pp. 3076–3110, 11.

Brochure—"Dual Pressure Relief Valve Assembly—Series 3155"; Superior Valve Company, Washington, Pennsylvania (1 page).

Brochure—"Pressure Relief Valve", Hansa Metallwerke AG, Stuttgart, Germany.

Brochure—"Change Over Valves for Binary Safety System", F.lli Guerra & Figli S.R.L., Milano, Italy.

*Primary Examiner*—John Fox
*Attorney, Agent, or Firm*—Killworth, Gottman, Hagan & Schaeff LLP

[57]  ABSTRACT

A by-pass ball valve, defining first, second and third ports lying respectively n three parallel planes, is made using two forged parts, a valve body and an elbow element, to reduce the number of operations required to seal the valve to one sealing operation. A valve control stem is mounted on the side of the valve and rotated through only 90° to facilitate switching the fluid path through the valve between a first path from the first port to the second port and a second path from the first port to the third port. The first port may be directed in a first direction with the second and third ports directed in second and third directions, respectively. However, it is currently preferred to have the second direction be the same as the third direction and to have all three directions lying in a single plane which is perpendicular to the three parallel planes of the first, second and third ports. While the elbow element may be used directly to secure the ball valve and ball seals within the valve body, to facilitate assembly of the valve and to provide an auxiliary seal, a rotary ball valve retaining bonnet is secured within the valve body and includes an auxiliary seal which is engaged and crushed, to the extent necessary, by the elbow element to properly orient the elbow element relative to the valve body prior to sealing the valve.

19 Claims, 2 Drawing Sheets

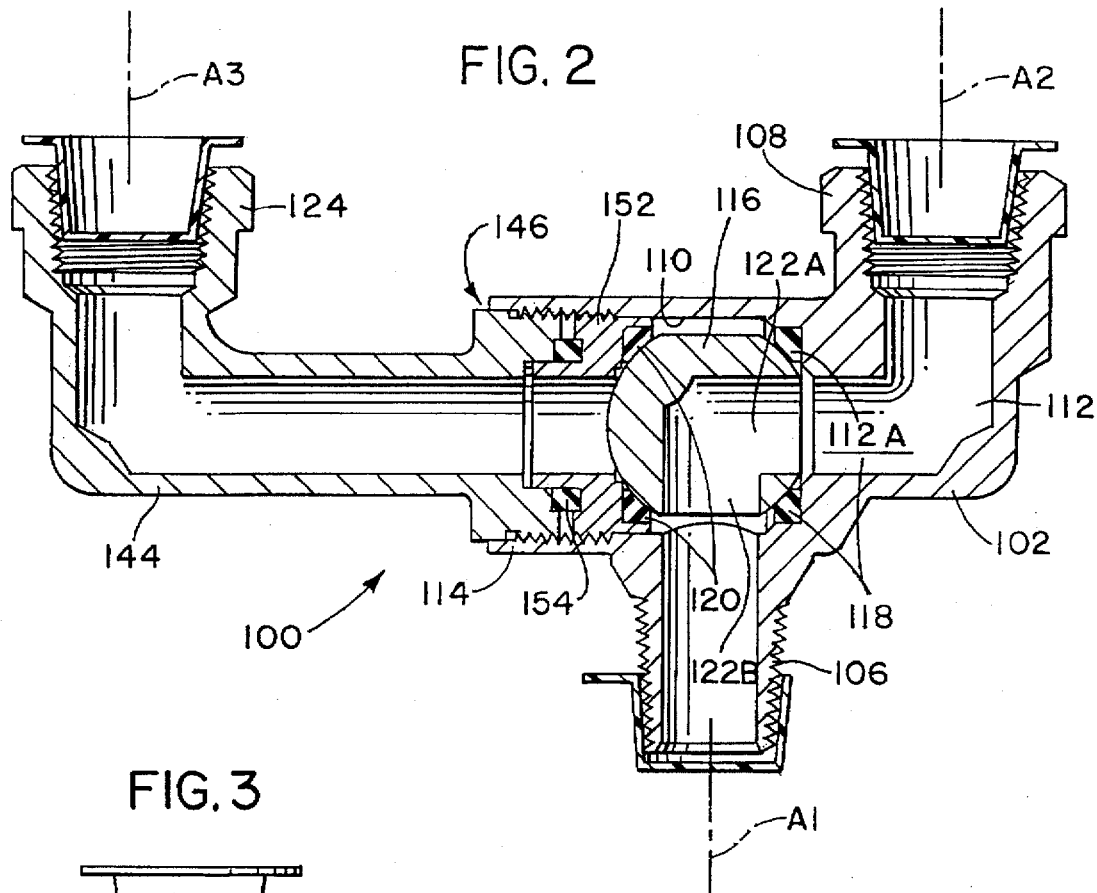
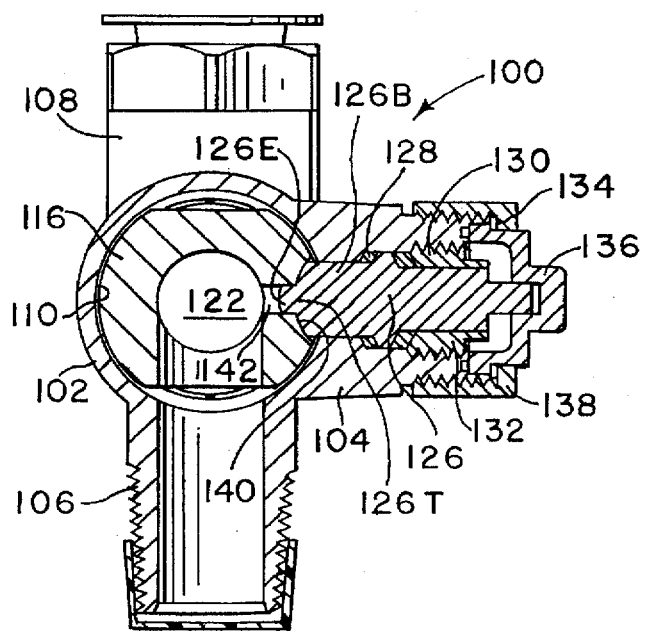
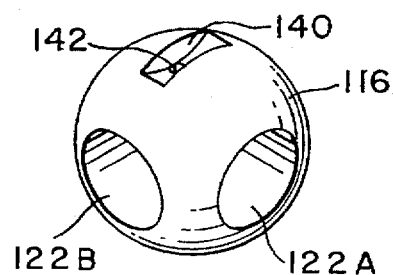

BY-PASS BALL VALVE

BACKGROUND OF THE INVENTION

The present invention relates in general to closed refrigeration and air conditioning systems and, more particularly, to a by-pass ball valve for use in such systems.

In refrigeration and air conditioning systems, three-way dual shut off valves are used, for example, for dual relief valve assemblies and drier by-pass applications wherein as one line is closed another line is simultaneously opened. One form of by-pass valve which is currently used includes a stem operator which is rotated to linearly move a closure element from a first position closing a first port of the valve to a second position closing a second port of the valve. A third port is connected to either the first or second port depending upon the position of the stem. Unfortunately, the closure element of this type of by-pass valve is continually located in the flow path and partially blocks or interferes with the fluid flow. Also, switching the flow path between the first and second ports requires removal of a protective cap and several rotations of the stem operator.

A conventional form of ball valve is also currently used as a by-pass valve in refrigeration and air conditioning systems. This by-pass valve defines three ports with a first or inlet port being generally perpendicular to second and third or outlet ports which are coaxial and are interconnected by a ball receiving chamber. If alternate outlet port positions are required for a given application, which is very common, additional elbow or other connector elements must be soldered to the ball valve. While this conventional ball valve is an improvement in terms of switching fluid flow between the two outlet ports, the ball valve rotation of a control stem of the valve through 180° which can be difficult in a tight installation.

Accordingly, there is a need for an improved by-pass valve which reduces the number of operations required to seal the valve to thereby simplify manufacturing and reduce costs. In addition, reduced control motion and enhanced sealing of the by-pass valve would be preferred.

SUMMARY OF THE INVENTION

This need is met by the invention of the present application wherein a by-pass ball valve, defining first, second and third ports lying respectively in three parallel planes, is made using two forged parts, a valve body and an elbow element, to reduce the number of operations required to seal the valve to one sealing operation. A valve control stem is mounted on the side of the valve and rotated through only 90° to facilitate switching the fluid path through the valve between a first path from the first port to the second port and a second path from the first port to the third port. While the first port may be directed in a first direction with the second and third ports directed in second and third directions, respectively, as illustrated and currently preferred, the second direction is the same as the third direction and all three directions lie in a single plane which is perpendicular to the three parallel planes of the first, second and third ports. While the elbow element may be used directly to secure the ball valve and ball seals within the valve body, to facilitate assembly of the valve and to provide an auxiliary seal, a rotary ball valve retaining bonnet is secured within the valve body and includes an auxiliary seal which is engaged and crushed, to the extent necessary, by the elbow to properly orient the elbow element relative to the valve body prior to sealing the valve.

In accordance with one aspect of the present invention, a by-pass ball valve includes a first port having a first axis, a second port having a second axis and a third port having a third axis. The first, second and third axes are parallel to but offset from one another and the by-pass ball valve comprises a valve body defining a neck portion, the first port, the second port and a ball receiving cavity interconnecting the first port and an offset channel leading to the second port. The ball receiving cavity terminates in a ball entrance channel through which a rotary ball valve is received within the ball receiving cavity of the valve body between a first annular ball seal adjacent the offset channel and a second annular ball seal adjacent the ball entrance channel. The rotary ball valve defines a passage therethrough which can be rotated between a first position connecting the first port to the second port and a second position connecting the first port to the third port. A rotatable operating stem is sealingly retained within the neck portion and engages the rotary ball valve for rotation of the rotary ball valve within the valve body between the first and second positions. An elbow element is engaged with the ball entrance channel and defines the third port. The valve body and the elbow element define a single band around which the by-pass valve can be sealed in a single sealing operation. Preferably, the first, second and third axes lie in a single plane and the neck portion is generally perpendicular to the single plane.

In accordance with another aspect of the present invention, a by-pass ball valve includes a first port having a first axis, a second port having a second axis and a third port having a third axis. The first, second and third axes lie within first, second and third parallel planes with the first axis being directed in a first direction in the first plane, the second axis being directed in a second direction in the second plane and the third axis being directed in a third direction in the third plane. The by-pass ball valve comprises a valve body defining a neck portion, the first port, the second port and a ball receiving cavity interconnecting the first port and an entrance to an offset channel leading to the second port. The ball receiving cavity terminates in a ball entrance channel through which a rotary ball valve is positioned within the ball receiving cavity of the valve body between a first annular ball seal adjacent the offset channel and a second annular ball seal adjacent the ball entrance channel. The rotary ball valve defines a passage therethrough which can be rotated between a first position connecting the first port to the second port and a second position connecting the first port to the third port. A rotatable operating stem is sealingly retained within the neck portion and engages the rotary ball valve for rotation of the rotary ball valve within the valve body between the first and second positions. An elbow element is engaged with the ball entrance channel and defines the third port. The valve body and the elbow element define a single band around which the by-pass valve can be sealed in a single sealing operation.

In an illustrated embodiment, the third direction is the same as the second direction. The entrance to the offset channel is generally perpendicular to the first direction such that the first axis and the entrance to the offset channel define a base plane perpendicular to the first second and third planes. Preferably, the neck portion is generally perpendicular to the base plane such that it is on the side of the valve to facilitate operation of the valve. Operation is further facilitated by having the rotary ball valve move between the first and second positions by rotation of the operating stem through only 90°. The ball entrance channel is substantially aligned with the entrance to the offset channel from the ball receiving cavity.

To help ensure proper switching and orientation of the ball valve in the first and second positions, the neck portion of the valve body includes first and second stops which are engaged by the rotatable operating stem to define the first and second positions of the rotary ball valve, respectively. Preferably, the by-pass ball valve further comprises a rotary ball valve retaining bonnet secured within the ball entrance channel for forcing the second annular ball seal into engagement with the rotary ball valve and hence, the first annular ball seal. To provide an auxiliary seal, an auxiliary seal is retained by the bonnet and engaged by the elbow element upon complete engagement of the elbow element with the valve body. Preferably, the auxiliary seal is crushable to facilitate assembly of the elbow element with the valve body.

It is, thus, an object of the present invention to provide an improved by-pass ball valve wherein a single sealing band is used; to provide an improved by-pass ball valve wherein the valve includes a control stem mounted on the side of the valve and rotated through only 90° to switch between two paths through the valve; and, to provide an improved by-pass ball valve wherein an auxiliary seal is provided to ensure proper sealing and to facilitate assembly of the valve.

Other objects and advantages of the invention will be apparent from the following description, the accompanying drawings and the appended claims.

BRIEF DESCRIPTION OF THE DRAWINGS

FIG. 2 is a cross section of the by-pass ball valve of FIG. 1 taken along a vertical sectioning plane passing through the section line 2—2;

FIG. 3 is a cross section of the by-pass ball valve of FIG. 1 taken along a vertical sectioning plane passing through the section line 3—3;

FIG. 5 is a perspective view of a rotary valve element of the ball valve of FIGS. 1–3.

DETAILED DESCRIPTION OF THE INVENTION

Figure 1:
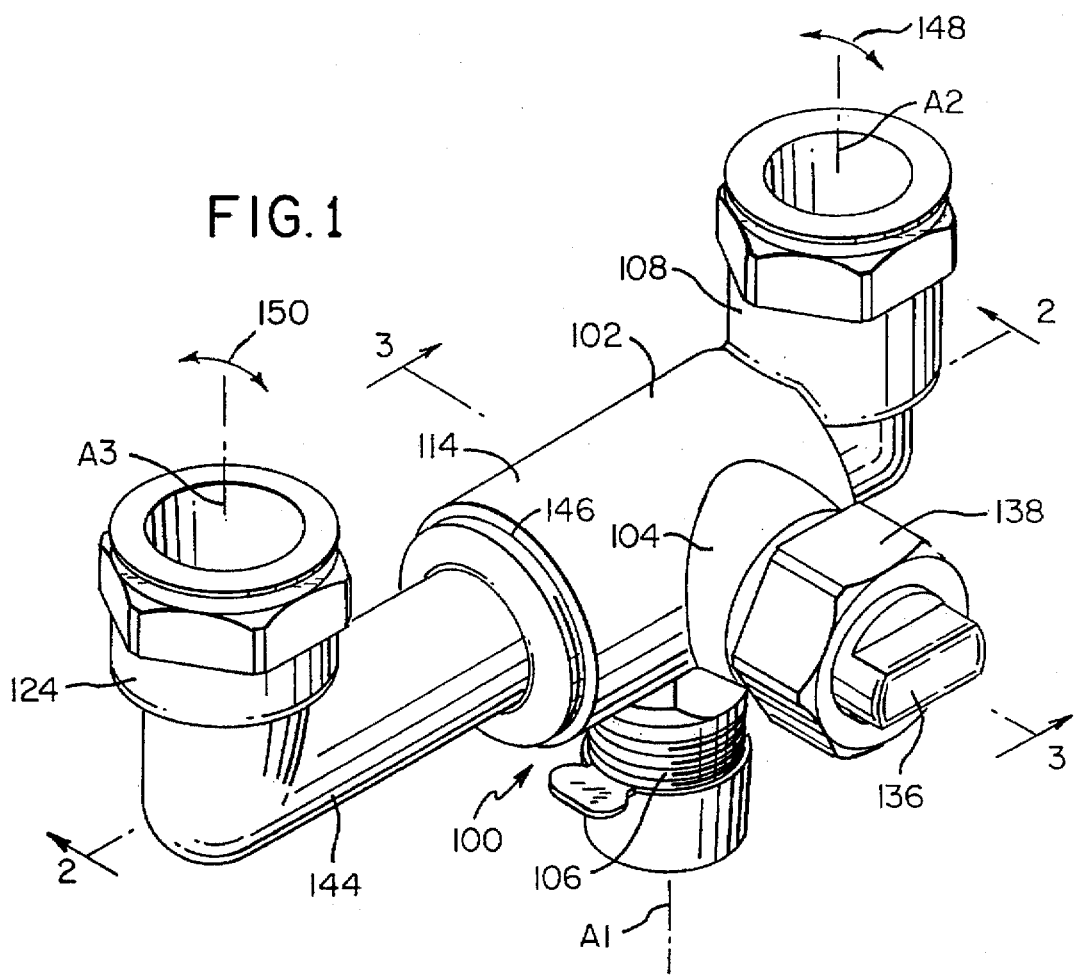
FIG. 1 is a perspective view of a by-pass ball valve in accordance with the present invention.

The invention of the present application will now be described with reference to the drawings which illustrate a currently preferred embodiment of a by-pass ball valve 100. Referring now to FIGS. 1–3, the valve 100 comprises a valve body 102 defining a neck portion 104, a first port 106 having a first axis A1, a second port 108 having a second axis A2 and a ball receiving cavity 110 interconnecting the first port 106 and a generally L-shaped offset channel 112 leading to the second port 108. As illustrated, the first port 106 is externally threaded while the second port 108 is internally threaded for convenient connection to intermating refrigeration lines. The ball receiving cavity 110 terminates in an internally threaded ball entrance channel 114.

A rotary ball valve 116 as shown in FIGS. 2, 3 and 5 is positioned within the ball receiving cavity 110 of the valve body 102 between a first annular ball seal 118 adjacent an entrance 112A to the offset channel 112 and a second annular ball seal 120 adjacent the ball entrance channel 114. The first and second ball seals 118, 120 preferably are made of tetrafluoroethylene. The rotary ball valve 116 defines a passage 122 therethrough which can be rotated between a first position shown in FIGS. 2 and 3 connecting the first port 106 to the second port 108 and a second position, not shown for sake of clarity, connecting the first port to a third port 124 having an axis A3. As illustrated, the third port 124 is internally threaded for convenient connection to an intermating refrigeration line. The second position of the rotary ball valve 116 can be clearly envisioned by a rotation of the rotary ball valve 116 as shown in FIG. 2 clockwise by 90° such that an end 122A of the passage 122 originally directed toward the entrance 112A of the offset channel 112 is moved to be directed toward the first port 106 and the end 122B of the passage 122 originally directed toward the first port 106 is directed toward the ball entrance channel 114.

Figure 4:
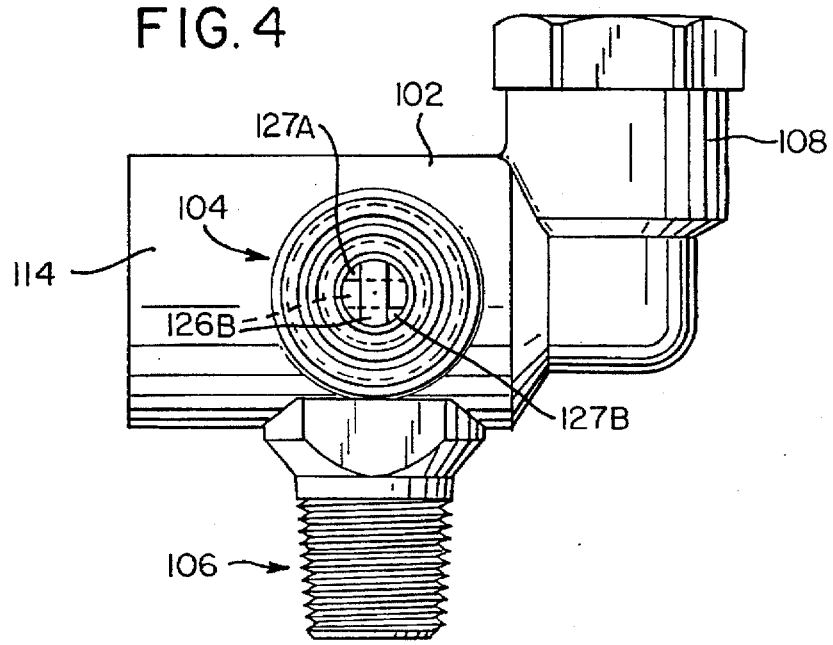
FIG. 4 is a front elevational view of a valve body of the by-pass valve of FIGS. 1–3.

A rotatable operating stem 126 is sealingly retained within the neck portion 104 and engages the rotary ball valve 116 for rotation of the rotary ball valve 116 within the ball receiving cavity 110 of the valve body 102 between the first and second positions. The first and second positions are shown in FIG. 4 by the blade portion 126B of the operating stem 126 shown in the first position, i.e., connecting the first port 106 to the second port 108, in a solid line drawing, and in the second position, i.e., connecting the first port to the third port 124, in a dotted line drawing. The blade portion 126B engages first and second stops 127A, 127B formed within the neck portion 104 of the valve body 102.

First and second packing rings 128, 130 are positioned on opposite sides of a radially expanded area of the stem 126 which is held in place by a packing nut 132. Gaskets 134 are placed on either side of a base flange of a seal cap 136 which is held in place by a seal nut 138. This structure of the rotatable operating stem 126 enables operation of the by-pass ball valve 100 without removal of the seal cap 136. The blade portion 126B of the rotatable stem 126 terminates in a semicircular tip 126T having a generally cylindrical extension 126E which is received in a mating slot 140 having a central bore 142.

An elbow element 144 is threadedly engaged with the ball entrance channel 114 and defines the third port 124. The valve body 102 and the elbow element 144 define a single band 146 around which the by-pass valve 100 can be sealed by suitable methods, such as welding, brazing or the like. The single band 146 is defined by the joint between the elbow element 144 and the valve body 102 as should be apparent.

In the illustrated embodiment, the first, second and third axes A1, A2, A3 are parallel to but offset from one another and all lie in a single plane. The neck portion 104 of the valve body 102 is generally perpendicular to the single plane which includes the first, second and third axes A1, A2, A3 such that the stem 126 is located on the side of the valve 100 to provide easy access for a wrench. Operation of the valve 100 is also facilitated since only 90° of rotation are required to switch the valve 100 from a connection between the first port 106 and either the second port 108 or the third port 124.

While the illustrated embodiment is currently preferred, applications are possible wherein the first, second and third axes A1, A2, A3 lie within first, second and third parallel planes, vertical parallel planes for the valve 100 shown in FIG. 1, with the first axis A1 being directed in a first direction in the first plane, the second axis A2 being directed in a second direction in the second plane and the third axis A3 being directed in a third direction in the third plane. Such alternate directions of the three axes can be accommodated by an altered formation of the valve body 102 as suggested by the arrow 148 and by alternate formation or assembly of the elbow element 144 to the valve body 102 as suggested by the arrow 150, see FIG. 1. The second and third directions can be the same as one another or different depending on the particular application.

In such alternate embodiments, the entrance 112A to the offset channel 112 is generally perpendicular to the first direction of the first axis A1 with the first axis A1 and the entrance 112A to the offset channel 112 defining a base plane perpendicular to the first second and third planes. To maintain the advantages of having the stem 126 located on the side of the valve 100, the neck portion 104 of the valve body 102 is generally perpendicular to the base plane.

The elbow element 144 can be produced such that it engages the second annular ball seal 120 adjacent the ball entrance channel 114. However, for ease of assembly of the valve 100, it is currently preferred to provide a rotary ball valve retaining bonnet 152 threadedly secured within the ball entrance channel 114 and forcing the second annular ball seal 120 into engagement with the rotary ball valve 116. For this structure of the valve 100, an auxiliary seal 154 is retained by the bonnet 152 and engaged by the elbow element 144 upon final positioning or complete engagement of the elbow element 144 with the valve body 102.

Preferably, the auxiliary seal 154 is crushable to facilitate assembly of the elbow element 144 with the valve body 102. That is, the auxiliary seal 154 may be compressed or crushed by the elbow element 144 to permit the elbow element 144 to be properly oriented relative to the valve body 102. The auxiliary seal 154 maintains the seal of the rotary ball valve 116 in the event of a failure of the second annular ball seal 120 adjacent the ball entrance channel 114.

The outer housing for the valve 100 comprises only two forged parts which are preferably made of brass; however other appropriate materials may be used for given applications. The valve 100 of the present application requires only one weld, i.e., at the single band 146 defined by the junction or joint between the elbow element 144 and the valve body 102.

Having thus described the invention of the present application in detail and by reference to preferred embodiments thereof, it will be apparent that modifications and variations are possible without departing from the scope of the invention defined in the appended claims.

What is claimed is:

1. A by-pass ball valve including a first port having a first axis, a second port having a second axis and a third port having a third axis, said first, second and third axes being parallel to but offset from one another, said by-pass ball valve comprising:
    a valve body defining a neck portion, said first port, said second port and a ball receiving cavity interconnecting said first port and an offset channel leading to said second port, said ball receiving cavity terminating in a ball entrance channel;
    a rotary ball valve positioned within said ball receiving cavity of said valve body between a first annular ball seal adjacent said offset channel and a second annular ball seal adjacent said ball entrance channel, said rotary ball valve defining a passage therethrough which can be rotated between a first position connecting said first port to said second port and a second position connecting said first port to said third port;
    a rotatable operating stem sealingly retained within said neck portion and engaging said rotary ball valve for rotation of said rotary ball valve within said valve body between said first and second positions; and
    an elbow element engagable with said ball entrance channel and defining said third port, said valve body and said elbow element defining a single band around which said by-pass valve can be sealed.

2. A by-pass ball valve as claimed in claim 1 wherein said first second and third axes lie in a single plane.

3. A by-pass ball valve as claimed in claim 2 wherein said neck portion is generally perpendicular to said single plane.

4. A by-pass ball valve as claimed in claim 1 wherein said ball entrance channel is substantially aligned with an entrance to said offset channel from said ball receiving cavity.

5. A by-pass ball valve as claimed in claim 1 wherein said operating stem is rotated through 90° to move said rotary ball valve between said first and second positions.

6. A by-pass ball valve as claimed in claim 1 wherein said neck portion includes first and second stops which are engaged by said rotatable operating stem to define said first and second positions of said rotary ball valve, respectively.

7. A by-pass ball valve as claimed in claim 1 further comprising a rotary ball valve retaining bonnet secured within said ball entrance channel and forcing said second annular ball seal into engagement with said rotary ball valve.

8. A by-pass ball valve as claimed in claim 7 further comprising an auxiliary seal retained by said bonnet and engaged by said elbow element upon complete engagement of said elbow element with said valve body.

9. A by-pass ball valve as claimed in claim 8 wherein said auxiliary seal is crushable to facilitate assembly of said elbow element with said valve body.

10. A by-pass ball valve including a first port having a first axis, a second port having a second axis and a third port having a third axis, said first second and third axes lying within first, second and third parallel planes with said first axis being directed in a first direction in said first plane, said second axis being directed in a second direction in said second plane and said third axis being directed in a third direction in said third plane, said by-pass ball valve comprising:
    a valve body defining a neck portion, said first port, said second port and a ball receiving cavity interconnecting said first port and an entrance to an offset channel leading to said second port, said ball receiving cavity terminating in a ball entrance channel;
    a rotary ball valve positioned within said ball receiving cavity of said valve body between a first annular ball seal adjacent said offset channel and a second annular ball seal adjacent said ball entrance channel, said rotary ball valve defining a passage therethrough which can be rotated between a first position connecting said first port to said second port and a second position connecting said first port to said third port;
    a rotatable operating stem sealingly retained within said neck portion and engaging said rotary ball valve for rotation of said rotary ball valve within said valve body between said first and second positions; and
    an elbow element engagable with said ball entrance channel and defining said third port, said valve body and said elbow element defining a single band around which said by-pass valve can be sealed.

11. A by-pass ball valve as claimed in claim 10 wherein said third direction is the same as said second direction.

12. A by-pass ball valve as claimed in claim 10 wherein said entrance to said offset channel is generally perpendicular to said first direction, said first axis and said entrance to said offset channel defining a base plane perpendicular to said first second and third planes.

13. A by-pass ball valve as claimed in claim 12 wherein said neck portion is generally perpendicular to said base plane.

14. A by-pass ball valve as claimed in claim 10 wherein said ball entrance channel is substantially aligned with said entrance to said offset channel.

15. A by-pass ball valve as claimed in claim 10 wherein said operating stem is rotated through 90° to move said rotary ball valve between said first and second positions.

16. A by-pass ball valve as claimed in claim 10 wherein said neck portion includes first and second stops which are engaged by said rotatable operating stem to define said first and second positions of said rotary ball valve, respectively.

17. A by-pass ball valve as claimed in claim 10 further comprising a rotary ball valve retaining bonnet secured within said ball entrance channel and forcing said second annular ball seal into engagement with said rotary ball valve.

18. A by-pass ball valve as claimed in claim 17 further comprising an auxiliary seal retained by said bonnet and engaged by said elbow element upon complete engagement of said elbow element with said valve body.

19. A by-pass ball valve as claimed in claim 18 wherein said auxiliary seal is crushable to facilitate assembly of said elbow element with said valve body.

* * * * *